Oct. 1, 1968 KATSUJI HIRAHARA ET AL 3,403,639

FRANGIBLE FROZEN SLAB HANDLING

Filed Dec. 15, 1966 12 Sheets-Sheet 1

INVENTORS
KATSUJI HIRAHARA
GERALD R. ANDERSON

BY Francis W. Anderson
ATTORNEY

INVENTORS
KATSUJI HIRAHARA
GERALD R. ANDERSON
BY
Francis W. Anderson
ATTORNEY

INVENTORS
KATSUJI HIRAHARA
GERALD R. ANDERSON
BY
Francis W. Anderson
ATTORNEY

Oct. 1, 1968 KATSUJI HIRAHARA ET AL 3,403,639

FRANGIBLE FROZEN SLAB HANDLING

Filed Dec. 15, 1966 12 Sheets-Sheet 4

INVENTORS
KATSUJI HIRAHARA
GERALD R. ANDERSON

BY

Francis W. Anderson
ATTORNEY

FRANGIBLE FROZEN SLAB HANDLING

Filed Dec. 15, 1966 12 Sheets-Sheet 5

INVENTORS
KATSUJI HIRAHARA
GERALD R. ANDERSON
BY
Francis W. Anderson
ATTORNEY

INVENTORS
KATSUJI HIRAHARA
GERALD R. ANDERSON
BY
Francis W. Anderson
ATTORNEY

FRANGIBLE FROZEN SLAB HANDLING

Filed Dec. 15, 1966 12 Sheets-Sheet 7

INVENTORS
KATSUJI HIRAHARA
GERALD R. ANDERSON
BY
Francis W. Anderson
ATTORNEY

INVENTORS.
KATSUJI HIRAHARA
GERALD R. ANDERSON
BY
Francis W. Anderson
ATTORNEY

INVENTORS
KATSUJI HIRAHARA
GERALD R. ANDERSON
BY
Francis W. Anderson
ATTORNEY

FRANGIBLE FROZEN SLAB HANDLING

Filed Dec. 15, 1966

INVENTORS
KATSUJI HIRAHARA
GERALD R. ANDERSON
BY
Francis W. Anderson
ATTORNEY

FRANGIBLE FROZEN SLAB HANDLING

Filed Dec. 15, 1966

INVENTORS
KATSUJI HIRAHARA
GERALD R. ANDERSON
BY
Francis W. Anderson
ATTORNEY

Oct. 1, 1968 KATSUJI HIRAHARA ET AL 3,403,639

FRANGIBLE FROZEN SLAB HANDLING

Filed Dec. 15, 1966 12 Sheets-Sheet 12

INVENTORS
KATSUJI HIRAHARA
GERALD R. ANDERSON

BY

Francis W. Anderson
ATTORNEY

United States Patent Office 3,403,639

Patented Oct. 1, 1968

3,403,639
FRANGIBLE FROZEN SLAB HANDLING

Katsuji Hirahara, San Jose, and Gerald R. Anderson, Campbell, Calif., assignors to FMC Corporation, San Jose, Calif., a corporation of Delaware Filed Dec. 15, 1966, Ser. No. 601,926
17 Claims. (Cl. 107—4)

ABSTRACT OF THE DISCLOSURE

Blocks of frozen food products are prepared. A conveyor indexes molds containing composite slabs of frozen material and divider strips past a slab handling station. The molds are thawed by a flying thaw tank, and the divider strips are gripped by a carrier, which is raised to extract the slabs from the molds. The slabs are brought up to breaker mechanism which frees the blocks of frozen product from the divider strips, whereupon the bare divider strips are reinserted into the molds.

BACKGROUND OF THE INVENTION

*Field of invention*

This invention relates to the preparation of blocks of frangible frozen molded material, such as blocks of edible soups, ice cream, vegetables, cooked meat in gravy, peas, corn, etc.

*Description of the prior art*

Multiple blocks frozen in a mold have also been frozen onto central extraction pins, and the pins pulled free of the blocks while the blocks are supported on a plate, e.g. Walker 2,182,713.

Sheets of crackers on a belt have been broken apart by sets of staggered rollers or the like, the upper set directly engaging the crackers, e.g. Carus 2,252,363 and Huber, Jr., et al. 2,261,062.

Slabs of scored chewing gum sticks have been directly engaged by upper and lower sets of staggered bars, e.g. Armstrong, 954,773.

SUMMARY OF THE INVENTION

Under the present invention, blocks of the frozen material are broken from frozen slabs of the material in a manner which minimizes contact with the frozen blocks outside of the molds. Parts engaging the product are readily cleaned and sterilized. Furthermore, the process lends itself to rapid, economical and automatic operation.

Elongate molds are formed for providing frozen material in frozen slab form. The molds normally carry inserts is the form of divider strips inserted therein in rows, and the starting material is placed in the mold assembly, whereupon the composite material and divider strip assembly is frozen into a slab. The slab configuration, as compared to a block of the same weight, provides a large heat transfer area for rapid freezing. The frozen slabs are then separated from their molds while supporting the slab by the divider strips, which project above the slab. The slab is broken into the blocks of the product material while thus supported, and in a manner which eliminates (or renders negligible) contact with the product material during the breaking process. The individual blocks are then ready for packaging or other disposition for the trade.

In accordance with the present invention, the composite slab is broken into blocks while the divider strips are supported in a manner which permits them to swing, but in one plane only. Edges of the divider strips are struck in a manner that imparts shear and bending forces to the slab relative to the dividers, thereby breaking it into blocks at the divider strips, which blocks fall free into a chute. Unless the divider strips are extremely smooth, there may be a tendency for the strips to adhere to single blocks. This is avoided by pushing on the dividers alone, causing them to rotate. The only portion of the frozen slab that is mechanically touched during the slab breaking is a narrow zone at the divider strips, and the divider strips are supported externally of the slab so that the support zones are readily cleaned.

The divider strips or inserts remain in circulation through the machine and throughout repetitive cycles. This is accomplished by reinserting temporarily abstracted divider strips or inserts into molds progressing through the machine, so that the divider strips are in place in the molds when the molds are washed and sterilized prior to refilling and recycling. The swinging or pivoting motion of the divider strips not only facilitates development of effective shear forces in the manner briefly described above, but also permits the entire composite slab to move to one side over a chute, so that the blocks falling into the chute can be diverted out to the end of the machine. The chute obviates the need for a mechanical takeaway conveyor, yet the chute does not unduly increase the height of the machine.

The divider strips in each mold are handled as a group, that is, they are handled simultaneously as an individual row. This makes possible a modular design of the extractor or carrier that lifts the divider strips and slab from the molds, and the dimensions of the blocks along the molds can be varied by merely changing the number of divider strips in a row.

It is usually necessary that heat be applied to the molds in order to facilitate release of the frozen material. This is usually done by bringing a thawing tank of heated liquid up to and around the exterior of the molds, thus deglazing the frozen material at their interfaces with the molds. In accordance with the preferred embodiment of the present invention, the molds are placed on an endless indexing conveyor, and the motion of the aforesaid thawing tanks up to and around the molds is carried out while the conveyor is indexing, thereby minimizing the cycle time. It has been found that when this feature of the invention is utilized, the cycle time, even through the divider strips are reinserted in the molds, need be no longer than a corresponding cycle where the divider strips are removed along with the frozen material, and left on the frozen material as in the case with prior manufacture of frozen confections, or the like.

The use of divider strips and molds of the type described facilitates elimination of sharp corners along the edges of the blocks which might damage the consumer packaging material into which the blocks are subsequently inserted.

The manner in which these and other features of the present invention can be obtained in practice will be apparent from the following detailed description of a preferred embodiment of the invention.

DESCRIPTION OF PREFERRED EMBODIMENT

The slab handling and breaking method of the present invention can be carried out by apparatus that has some features in common with frozen confection making machines such as that shown in the patent to Rasmusson 3,031,978. Machines of this type are arranged for indexing a plurality of molds, filling the molds, freezing the product and thawing the frozen product for its removal. These machines also provide for washing and sterilizing the molds after they have been emptied and before they are refilled with unfrozen products.

Figure 1:
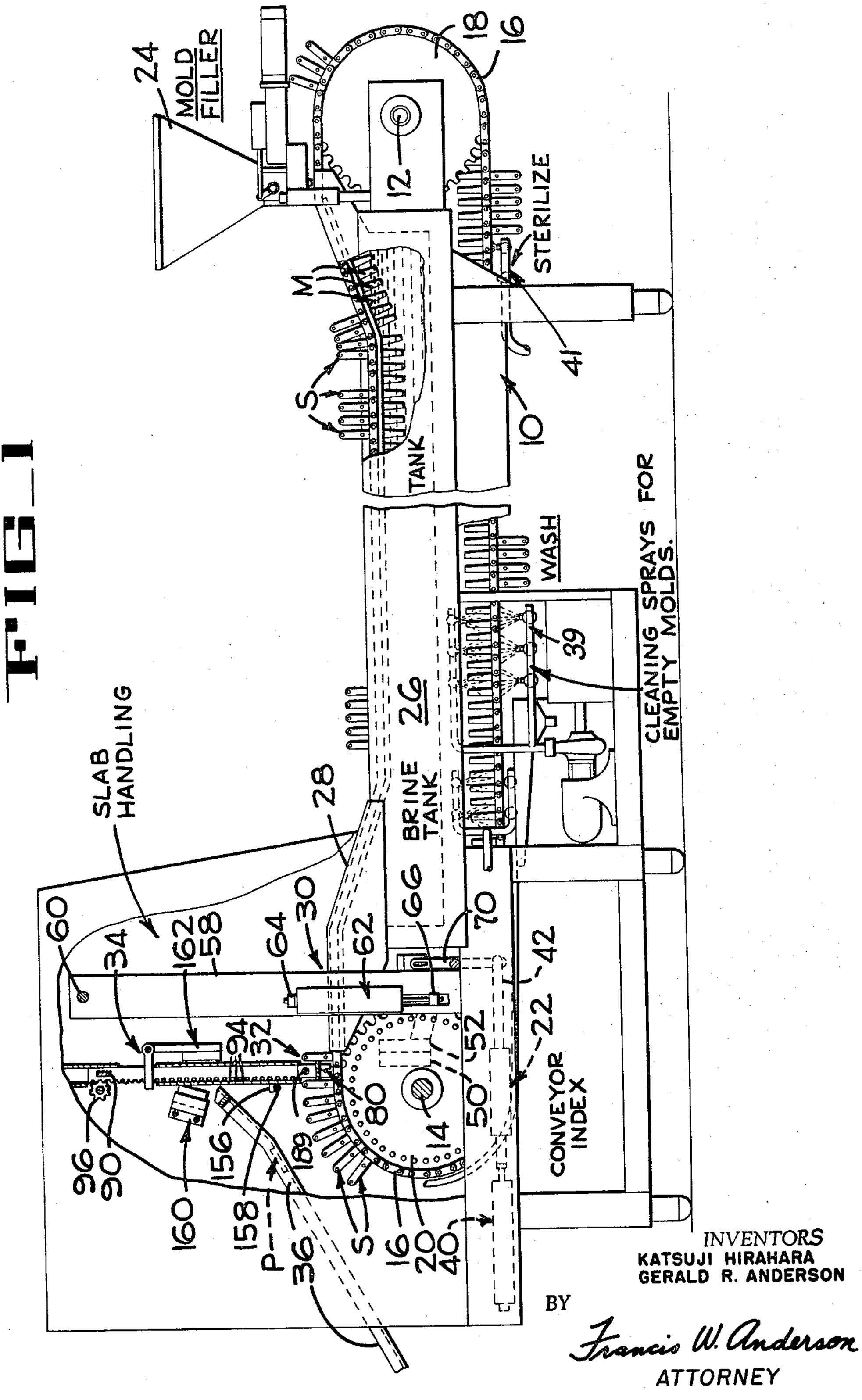
FIGURE 1 is a side elevation of a machine embodying the invention with a portion of the frame broken away.

Referring to FIGURE 1, the present invention can be carried out in an apparatus having a frame indicated generally at 10 which mounts end conveyor sprocket shafts 12 and 14. Elongated molds M are supported at each end on laterally spaced conveyor chains 16 trained around sprockets 18, 20 mounted on the sprocket shafts. Except for a brief interval during the slab handling cycle, each of the molds M contains a row of divider strips S. The conveyor chains and mold assemblies are indexed by mechanism 22, to bring the molds one at a time to the various stations of the apparatus. Thus, the molds are individually stopped beneath a mold filler 24 and advanced intermittently through a brine tank 26 which contains brine at a sub-freezing temperature such as minus 30 degrees F. Here the starting material is frozen into slabs comprising product blocks interrupted by the divider strips S adhered to the blocks. The molds and frozen slabs emerge from the brine tank and are advanced along an ascending reach 28 of the chain conveyor to the slab handling apparatus of the present invention.

At the slab handling apparatus, the molds containing the frozen slabs of material are externally thawed, to release the slabs from the molds, by a flying defrost mechanism 30. During an initial part of the thawing step, the molds are indexed to an extractor or carrier apparatus 32. Here, the projecting upper portions of the divider strips S are received in the carriers, the slabs are extracted from the molds, and are raised to a breaker mechanism 34. The breaker is carrier-activated to rap the composite slab and break it into individual blocks P of frozen product material. The blocks slide down a delivery chute 36 underlying the breaker mechanism 34.

The carrier mechanism 32 next lowers each row of free divider strips S and reinserts them simultaneously into the molds M. Once reinserted, the conveyor index mechanism 22 removes the recently emptied mold from beneath the carrier and introduces a new filled mold thereunder. As the emptied molds leave the carrier, they are successively advanced to a mold washing unit 39 and to a sterilizing unit 41 the details of which are not critical to the present invention. The sterilized molds and their divider strips are finally returned to the mold filler 24 and recycled through the apparatus.

CONVEYOR INDEX MECHANISM

The conveyor index mechanism 22 advances the chains 16 by a distance equal to the center to center spacing of adjacent molds M, to bring each mold successively to the various stations. This mechanism is like that described in detail in the aforesaid Rasmusson Patent 3,031,978, and since details of the index mechanism are not critical to the invention, the mechanism will be described briefly. The conveyor chains 16 are indexed by a timed reciprocating cylinder and piston assembly 40, (FIGS. 2 and 4), the piston rod being connected to a pusher rod 42 mounting a pawl 44 (FIG. 2), as in the aforesaid Rasmusson patent. On the advance stroke of the pusher rod 42 (to the right as viewed in FIGURE 2), the pawl 44 picks up and moves a pin 46, forming a series of pins on the drive sprocket 20. The geometry of the sprocket and pawl assembly is such that the sprocket 20, shaft 14 and the corresponding sprocket on the other side of the machine are indexed a distance sufficient to advance the chains 16 by the unit spacing of the molds M. Operation of the index piston and cylinder assembly 40 is timed with that of the other portions of the slab handling apparatus, in a manner to be described later in connection with the drawings of FIGURES 17 to 22.

DEFROST MECHANISM

The defrost tank mechanism 30 (FIGURES 2, 4 and 5) has a component of motion in the horizontal plane that is in synchronism with the motion of the molds M, in order that defrosting can be effected during indexing of the conveyor chains. This makes it possible to utilize what otherwise would be a dead portion of the cycle.

Figure 2:
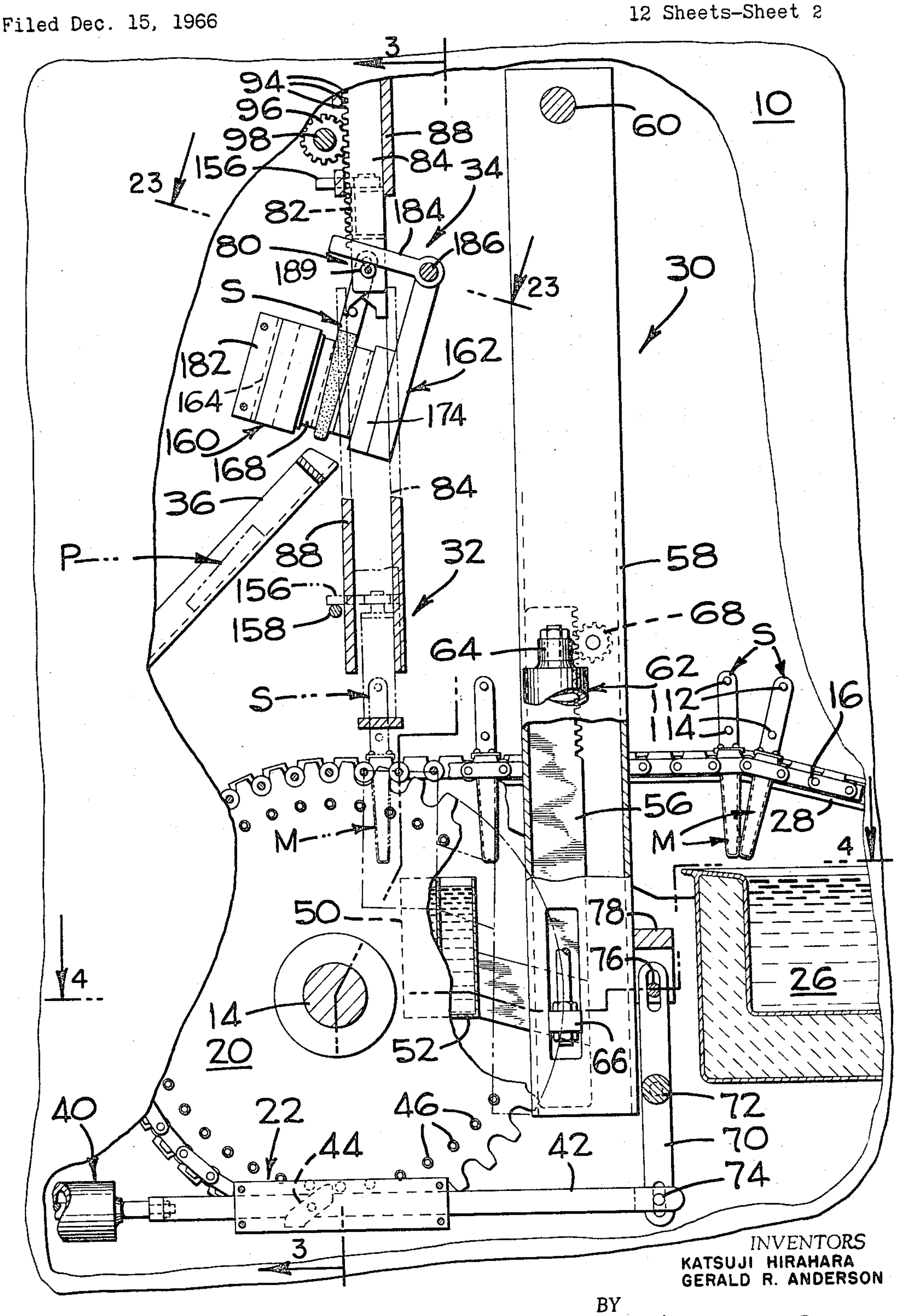
FIGURE 2 is a similar but enlarged side elevation of the slab handling portion of the apparatus.
Figure 4:
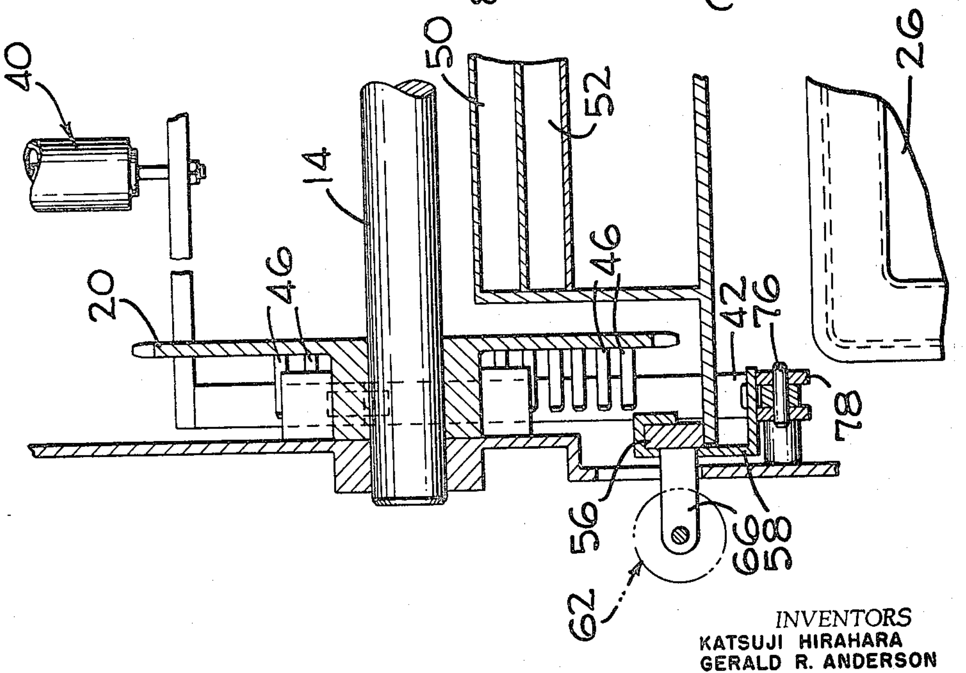
FIGURE 4 is a horizontal section taken on line 4—4 of FIGURE 2 showing the index and thaw tank operating mechanisms.

Defrost tanks 50, 52 extend the full width of the molds M and are supported on a pair of vertical racks 56 (FIGS. 2 and 4) for motion in the vertical plane, to bring the defrost tanks up to and around the molds, and to lower them to clear the molds. Each rack 56 is slidably mounted on a swinging arm 58, there being one arm pivoted to each side of the frame at 60. The defrost rack 56 on one side, as shown in FIGURES 2 and 4, is reciprocated by a piston and cylinder assembly 62. One element of this assembly is supported at 64 on the swinging arm 58 and the other element (the piston rod in this case) is connected at 66 to the associated rack 56. In order to simplify the timing of the machine, a single piston and cylinder assembly 62 is provided and the two racks 56 are geared together by means of a cross shaft and pinions 68, FIGURES 2 and 5.

The horizontal or flying motion of the defrost tanks 50, 52 is provided by the indexing push rod 42. During indexing motion of this rod (motion to the right as viewed in FIGURE 2), a corresponding motion is imparted to the defrost tanks 50, 52 in the direction of advance of the upper reach of the chains 16. The tanks are moved back by the rod 42 when the latter is retracting, during dwell of the conveyor. In order to accomplish this, a first class lever 70 is pivoted at 72 to the frame of the apparatus. The lower end of the lever makes a sliding, pivotal connection 74 with the rod 42. The upper end of the same lever makes a sliding, pivoting connection 76 with a block 78, projecting from the defrost tank supporting arm 58 on the associated side of the apparatus. The geometry of the construction is such that during indexing, the defrost tanks 50, 52 move synchronously in the direction of motion of the upper regions of the chains 16 and the associated molds. At the same time, the defrost actuating piston cylinder assembly 62 raises the tanks to bring them up to and surrounding the molds, so that the frozen slabs within the molds are freed for extraction. The defrost tanks 50, 52 are shown in their lowered, retracted position in solid lines in FIGURE 2, and in their raised and advanced position in broken lines in that figure. The tanks are lowered by assembly 62 before they are moved back by the conveyor index rod 42.

EXTRACTOR MECHANISM, GENERAL

Figures 10, 11:
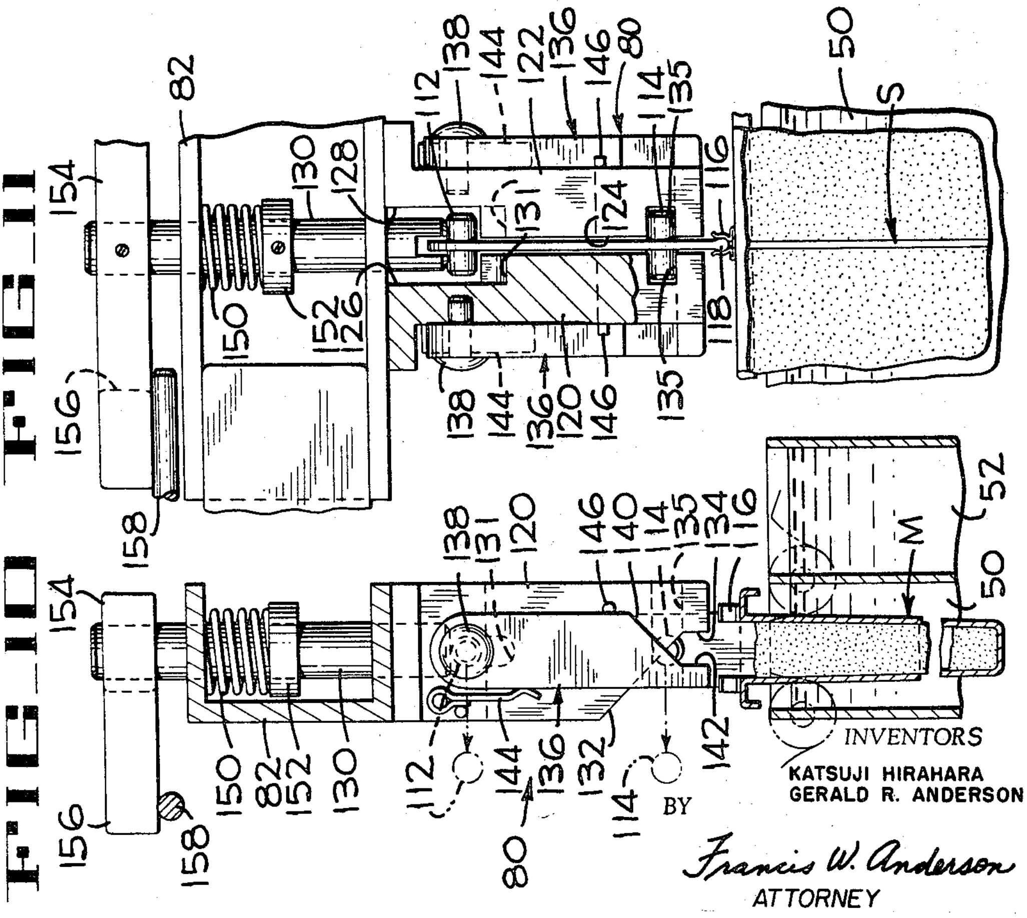
FIGURE 10 is an enlarged side elevation of the carrier with the latter lowered to receive divider strips from the conveyor.
FIGURE 11 is a front elevation of the same with one carrier block broken away.

The frozen slab extractor and carrier mechanism 32 will now be described in connection with FIGURES 2, 3, 5, 10–13, and 15. Briefly, the principle of the operation of this mechanism is as follows: When the extractor is in its lowered position, recesses formed in carrier blocks 80 are lined up with divider strip support means in the form of pins 112 and 114 projecting laterally from the divider strips S (FIGS. 10 and 11). During indexing, these pins slide in to the carrier blocks. After the indexing cycle has ended, the carrier blocks are raised (FIGS. 12 and 13) thereby lifting the thawed slab of frozen material clear of its mold and bringing it up to the breaker mechanism 34 (FIG. 2).

Figure 3:
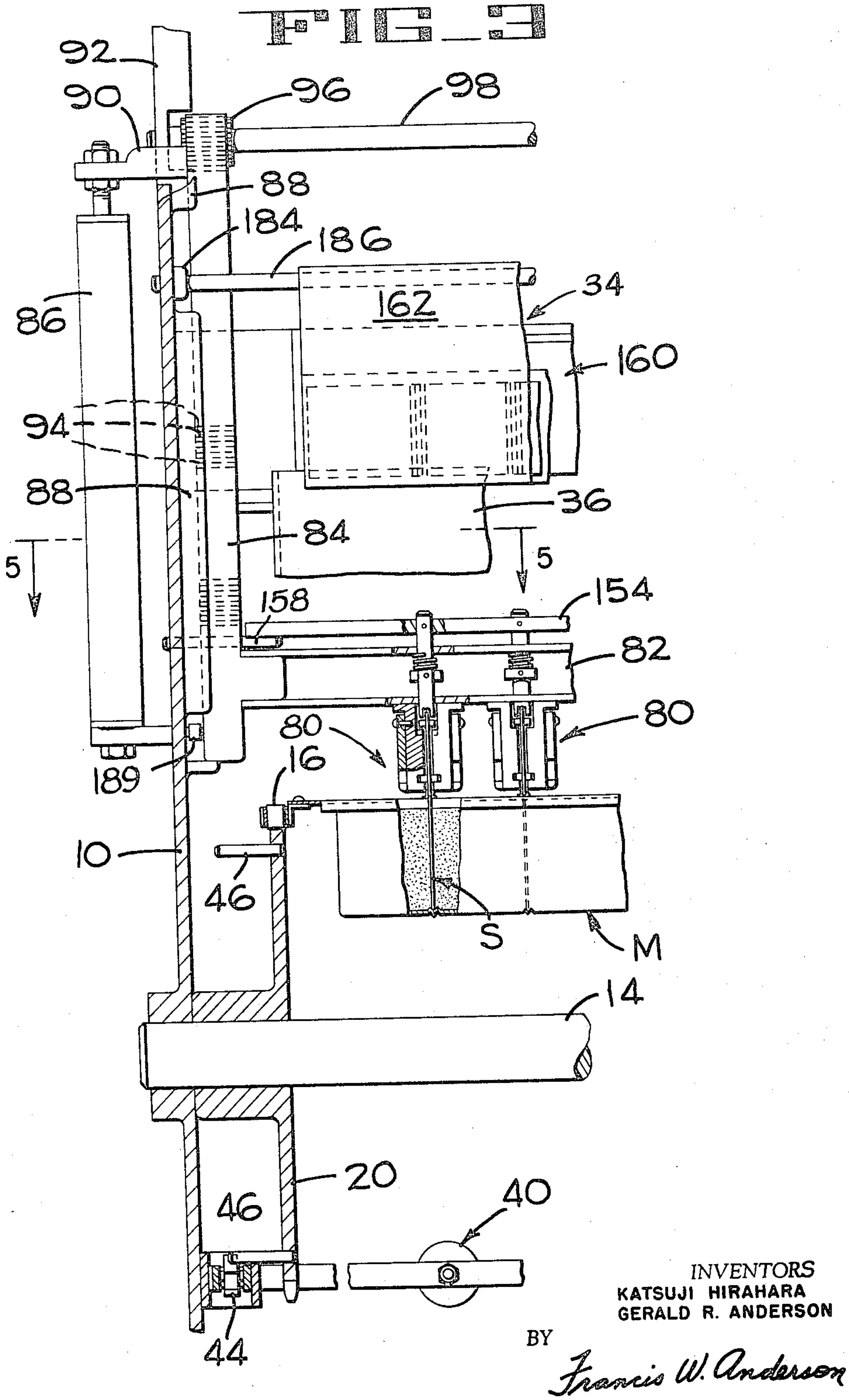
FIGURE 3 is a vertical section taken on line 3—3 of FIGURE 2, showing the carrier mechanism.
Figure 5:
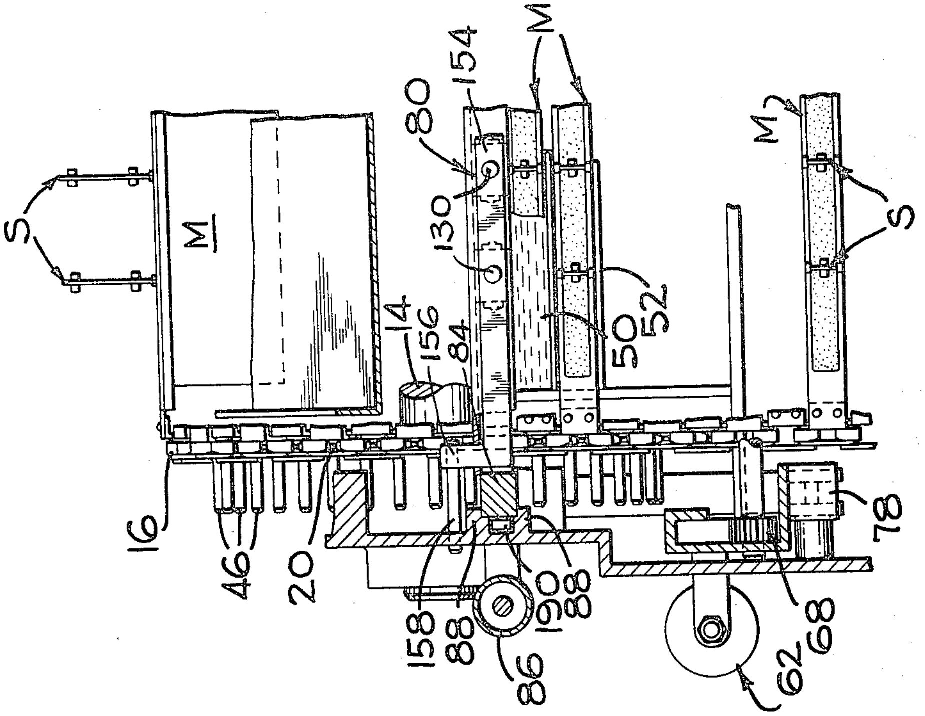
FIGURE 5 is a horizontal section taken on line 5—5 of FIGURE 3 at the carrier.

A carrier block assembly 80 is associated with each of the divider strips S. These assemblies depend in a row from a transverse channel 82 (FIG. 11) which extends across the machine. Each end of the channel 82 is supported by a vertically reciprocating extractor bar 84 (FIG. 3), and one of these bars is reciprocated by piston and cylinder mechanism 86 (FIGURES 3 and 5). The extractor bars 84 slide in tracks 88 (FIGS. 2, 3 and 5) projecting from the frame 10, and an arm 90 (FIG. 3) projects outwardly from the upper end of the bar 84 shown in the drawings, for connection to a piston and cylinder assembly 86. The arm 90 slides through a slot 92 (FIG. 3) formed in the frame 10. In order to synchronize the bars 84 and obviate the need for two cylinders 86, each of the bars 84 is formed with rack teeth 94 which engage pinions 96 on a cross shaft 98 (FIGURES 2 and 3) extending between the two sides of the frame.

As mentioned, in order to individually receive and grip the divider strips in each row when the conveyor is indexed underneath the extractor mechanism 32, a row of extractor or carrier blocks 80 depends from the channel 82. The carrier blocks function in four stages. First, they are lowered to a position for receiving the pins on the divider strips S above keeper notches. Second, when the extractor bars 84 and the channel 82 are raised, the divider stop pins drop into the keeper notches and the blocks lift the frozen slab clear of the mold by means of the divider strips. Third, the blocks 80 are constructed to permit relative swinging of the divider strips S in a plane perpendicular to that of the mold (see FIGURE 26), during the slab breaking portion step of the process. The strips are supported so that they cannot twist while swinging. Finally, the carrier blocks restore the strips to the vertical and are lowered to reinsert the strips into their mold.

MOLD DESIGN

Figure 6:
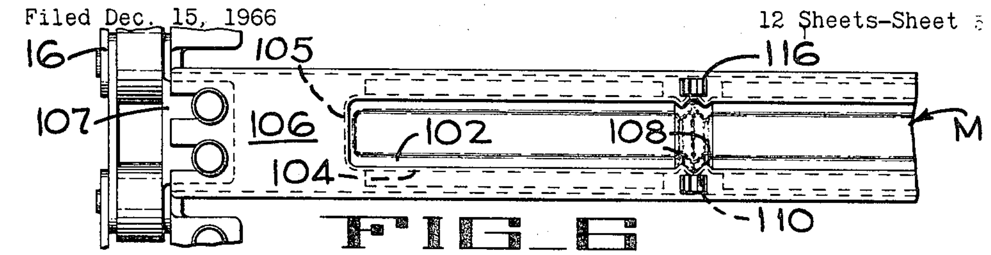
FIGURE 6 is a fragmentary plan of a slab mold.
Figure 7:
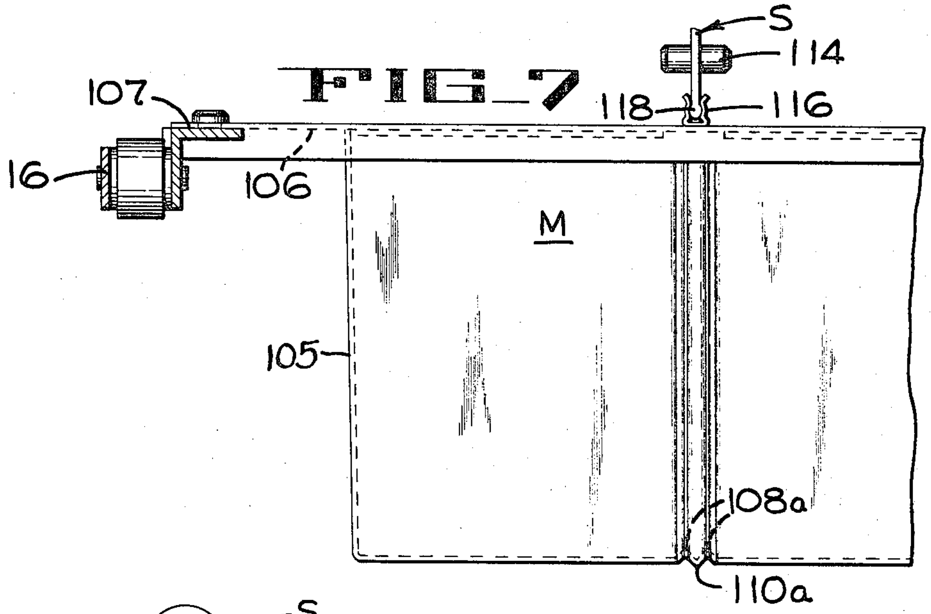
FIGURE 7 is a fragmentary side elevation of the slab mold and the lower part of one divider strip.
Figures 8, 9, 14:
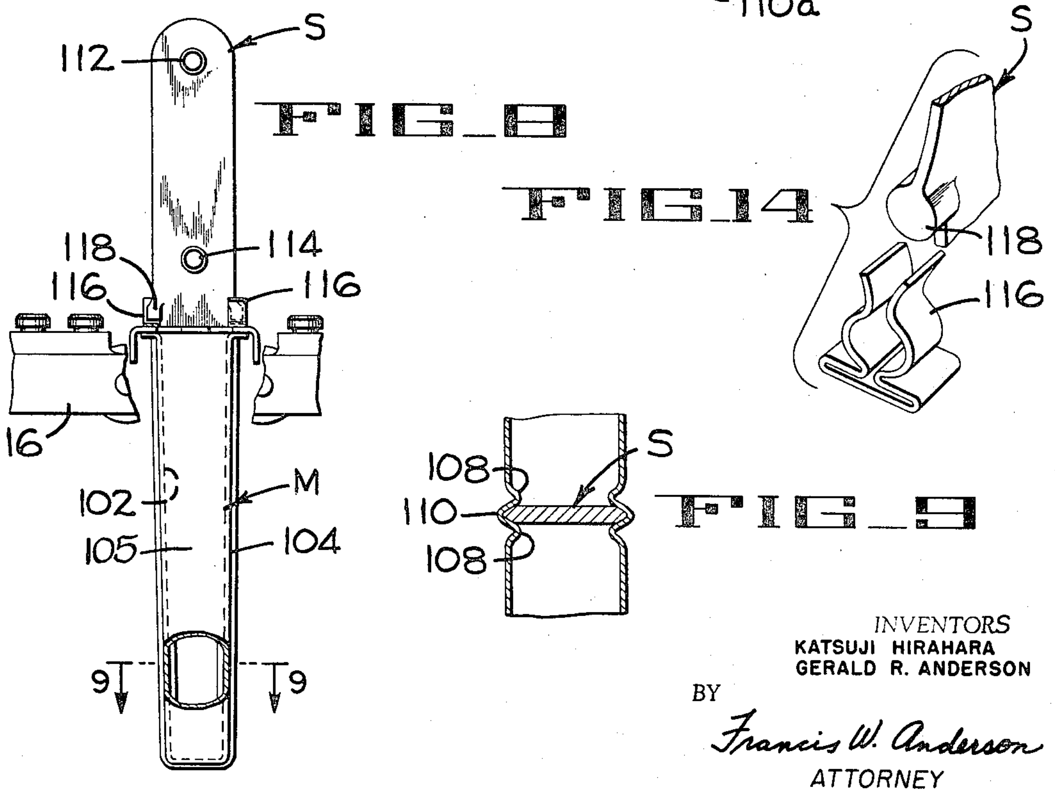
FIGURE 8 is an end elevation of a slab mold with divider strips in place.
FIGURE 9 is a fragmentary section through the mold taken on line 9—9 of FIGURE 8.
FIGURE 14 is an enlarged perspective of the divider strip retainer arrangement.

The construction of the molds M mounting on the conveyor and the construction of the divider strip S will now be described in order to facilitate a more detailed understanding of the operation of the carrier blocks. Referring to FIGURES 6–9 and 14, the mold and divider strips are shown here on a relatively enlarged scale. In the embodiment being illustrated and described, the molds are designed to produce individual blocks P about five inches long (laterally) six inches deep (vertically) and something under one inch thick. Each mold M is formed with a single tapered cavity 102 that extends entirely across the length of the mold (the lateral dimension of the mold when it is installed in the apparatus). The side walls 104 of the mold cavity converge toward the bottom, as seen in FIGURE 8, to provide relief so that the frozen slab can be withdrawn from the mold. As seen in FIGURES 6 and 7, the end walls 105 of the mold cavity may also converge toward the bottom to provide end relief. Each end of the mold has flanges 106 detachably mounted on ears 107 projecting from the special links forming the conveyor chains 16.

The side walls 104 of the molds are formed to provide ribs 108 and a groove 110 (FIGURES 6 and 9) for receiving the side edges of the divider strips S. The divider strips are contoured to fit the grooves 110 snugly, so that the frozen material cannot be trapped between the divider strips and the side walls of the mold. As seen in FIGURE 8, the ribs and grooves continue around the bottom of the mold as indicated at *108a* and *110a*. Thus, a snug fit between the divider strips and the bottom of the mold is likewise provided.

This construction minimizes the formation of sturdy sharp corners at the edges of the blocks of frozen material that might cut the packages in which the completed blocks are wrapped. The slight feathering at the ribs 108 is weakened during thawing. It likewise facilitates breaking of the bars of material loose from the divider strips as well as providing guide channels for the dividing strips when they are reinserted into the molds. The cavity walls of the molds are highly polished for cleanliness and ease of release and the molds are formed of a non-corroding material such as nickel or stainless steel.

The divider strips S have blades that are contoured to fit within the mold cavities and within the grooves 110 between the ribs 108, in a manner obvious from FIGURES 6 to 9 of the drawings. As previously mentioned, the upper portion of each divider strip projects above the top of the mold cavities and is provided with cross pins, namely a pivot pin 112 and a steady pin 114 for coaction with the carrier blocks 80.

Since the apparatus reinserts the divider strips into the mold after the slab has been broken from the strips, it is necessary that the divider strips be releasably retained in the molds so that they will not fall out on the lower reach of the conveyor chain 16 (see FIGURE 1). In the embodiment shown, this function (FIGS. 7, 8 and 14) is served by a pair of spring clips 116 at each side of a divider strip channel. The clips grip enlargements 118, formed at the junction of the protruding portion of each divider strip and the blade portion thereof which fits into the mold cavity.

EXTRACTOR BLOCKS

The construction of the mold and the divider strips of the preferred form having been shown, the detailed description of the extractor blocks 80 will now be resumed. Each block has a two-piece body (FIG. 11) formed of right and left sections 120, 122 having flanged upper portions secured to the channel 82. The sections are gapped at 124 to freely receive the upper portion of a divider strip S. The upper portion of each body is further relieved at 126, 128 to receive a detent post 130, as will be described in detail presently. Each of the body portions 120, 122 is formed with an upwardly opening keeper notch 131 for the upper, pivot pin 112 of the divider strip. The vertical recess formed by relieved portions 126, 128 extends entirely across the block longitudinally of the machine, so that the pins 112 can slide into position above the keeper notches 131 in the assembled blocks as well as slide out from the zone of the blocks when the conveyor chain indexes again.

Figures 12, 13:
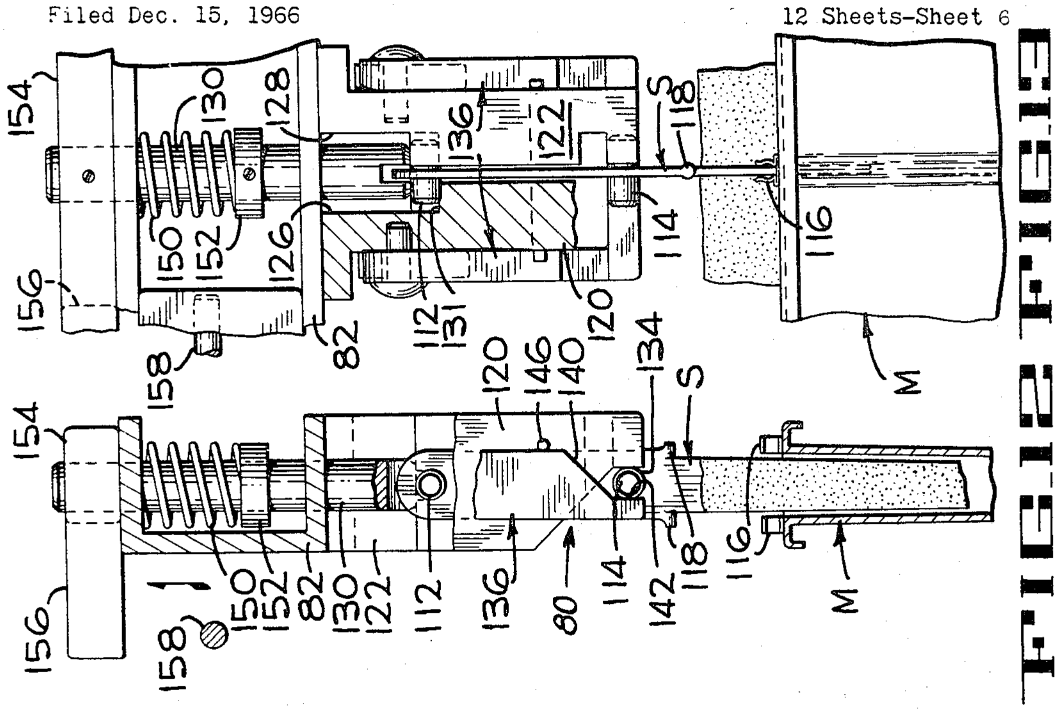
FIGURE 12 is a side elevation like that of FIGURE 10, but with the carrier and slab partially raised from the mold.
FIGURE 13 is a front elevation of the same.

The lower end of each of the paired block bodies is beveled back at 132 and terminates in a downwardly projecting steady abutment 134. Each block is slotted at 135 to accommodate the lower pins 114 of the dividers so that when the conveyor is indexed, these pins can be stopped into position in vertical alignment with the inner edges of the abutment 134 (FIG. 10). In order to steady the steady pin 114 against the abutment 134 (FIG. 12), a finger 136 is pivotally mounted on each of the sections 120 and 122 by means of a pivot 138. The fingers are beveled back at 140 to provide a companion abutment 142, which faces the abutment 134 on the associated body portion and is spaced therefrom by the diameter of the keeper pin 114. A leaf spring 144 (FIGURE 10) is mounted on each of the block bodies and presses against the associated finger 136, to steady the pin 114 when the carrier has been raised, as seen in FIGURES 12 and 13. A stop pin 146 (FIGURES 10 and 12) prevents overtravel of the fingers 136.

Means are provided to insure that the divider strip pins 112, 114 are firmly seated in the extractor blocks when the extractor or carrier is raised toward the slab breaker. This is accomplished by seating posts 130 (FIGS. 10–13). These posts are urged downwardly by springs 150 that are compressed between the upper wall of the channel 82 and a collar 152 on each post. When the extractor bar has been raised somewhat from its divider strip receiving position, and is moving towards or away from the slab breaker, the springs 150 lower the posts 130 to seat the upper pins 112 in the carrier block notches 131, as seen in FIGURES 12 and 13.

In order to retract the seating posts 130 to the position shown in FIGURES 10 and 11 (and also in FIGURE 3) so that the divider strips can enter the extractor blocks 80, the upper end of each post is slidably mounted in the cross channel 82 and is fixed to a transverse post restrainer bar 154. The bar is parallel to the channel 82, and has a longitudinally projecting finger 156 at each end. A pin 158 (see FIGURES 3 and 5 as well as FIGURES 10 and 11) projects inwardly from each side of the frame, and the finger is positioned relative to the molds M so that when the carrier block is fully lowered, the pins 158 restrain the restrainer bar 154 during the final downward motion of the channel 82 and the attached extractor blocks 80. Thus, the posts 130 are left behind during this final lowering motion, as indicated most clearly in FIGURES 10 and 11. The proportioning is such that once the divider strips S have been completely reinserted into the molds M, the carrier blocks 80 can be lowered additionally by substantially the diameter of the pins 112, 114, to clear the pins for indexing of the conveyor (FIGS. 10 and 11).

SLAB BREAKER

As previously mentioned, means are provided for breaking the composite slab into individual blocks or bars at the upper portion of the stroke of the extractor mechanism 32. This is the breaker mechanism 34, which includes a fixed (abutment) breaker 160 and a movable breaker 162 (FIGS. 1 and 2). The frozen slab is rapped against the fixed breaker 160 by the movable breaker 162, which breaks the slabs into the bars P, which bars slide down the chute 36.

Referring to FIGURES 2 and 23–26, the fixed breaker 160 includes a base plate 164 mounted across the frame, which plate mounts vertical abutment bars 166 spaced by a distance that is twice the center to center spacing of the divider strips S. In order to eliminate pockets, a cover plate 168 is welded in zigzag fashion along the free edges of the abutment bars 166 and also to the base plate 164 at intermediate points 170.

The movable breaker bar 162 has a base plate 174, striker bars 176, and a cover plate 178 welded to the bars 176 and to the base plate at intermediate points 180. This mutually complementary construction acts so that during the slab breaking operation, the breaker bars are simultaneously pressed against the slab at opposite edges of adjacent divider strips, for breaking the slab apart at the divider strips into the product bars P.

As seen in FIGURE 2, the fixed breaker bar 160 extends across the frame and is mounted on brackets 182, inclined at an angle so that the cover plate 168 which actually receives the impact of the slab during the breaking operation will be substantially parallel to the associated face of the slab, after the slab has swung away from the vertical by a relatively small angle. This angle is sufficient, however, to bring the lower end of the slab in alignment with the entrance of the chute 36.

The movable breaker bar 162 is brought against the slab from its initial vertically hanging position and raps the slab against the fixed breaker by means of a finger 184 projecting from each end of a cross shaft 186. The shaft 186 extends laterally across the machine and pivotally supports the movable breaker assembly 162. This construction is best seen in FIGURES 2 and 3.

The movable breaker assembly 162 normally hangs in a position so that the breaker bar is substantially vertical, to clear the slab as it is raised by the extractor mechanism 32 into position between the breaker bars. Near the end of the upward stroke of the extractor, a cam roller 189 mounted on the lower portion of the vertical bar 84 (see FIGURES 2, 3 and 5), is brought forcibly up against the under surface of each finger 184. This causes the pivotal slab breaking motion of the movable breaker bar assembly 162, previously described.

Figure 26:
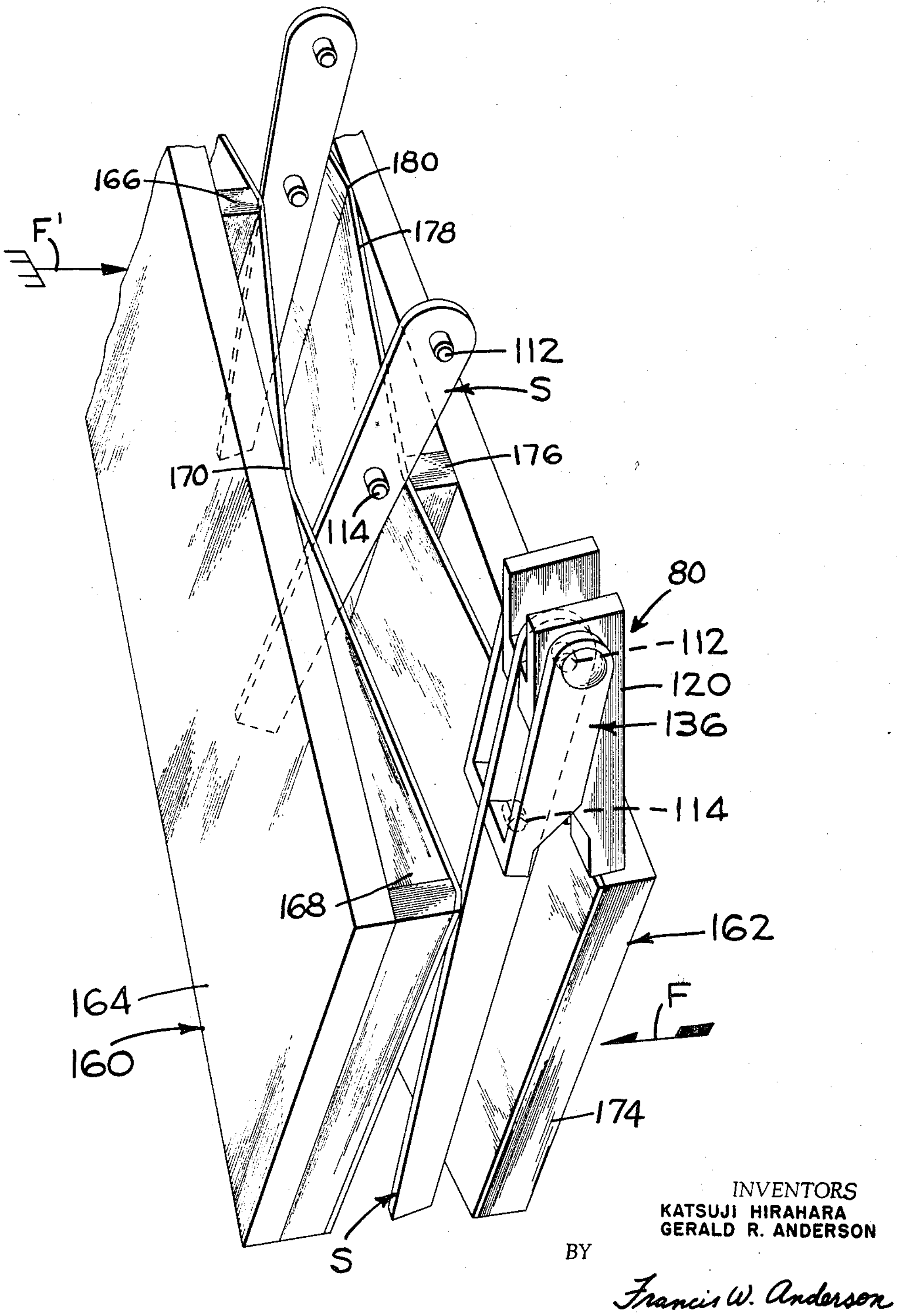
FIGURE 26 is a fragmentary perspective diagram showing the swinging action of the divider strips during breaking up of the slab into blocks.

During the final slab breaking motion, and as seen in FIGURE 2, the cam roller 189 is substantially in alignment with the pivot pins 112 on the divider strips. This construction provides the swinging geometry shown in FIGURE 26, so that the divider strips can swing in about their upper or pivot pins 112. Also, as illustrated in the diagram of FIGURE 26, the divider strips can swing relatively in opposite directions. During the breaking action, the levers 136 are opened against the springs 144 (FIGURE 10) to accommodate the swinging of the divider strips from the vertical. These spring loaded levers also insure return of the divider strips to their vertically oriented position upon lowering of the carrier and consequent retraction of the movable breaker bar assembly 162, so that the divider strips can be reinserted into the mold. This completes a detailed description of the various mechanical elements of the embodiment of the invention herein illustrated.

CYCLE DIAGRAMS

Figures 15, 16, 16A, 16B, 16C, 16D, 16E:
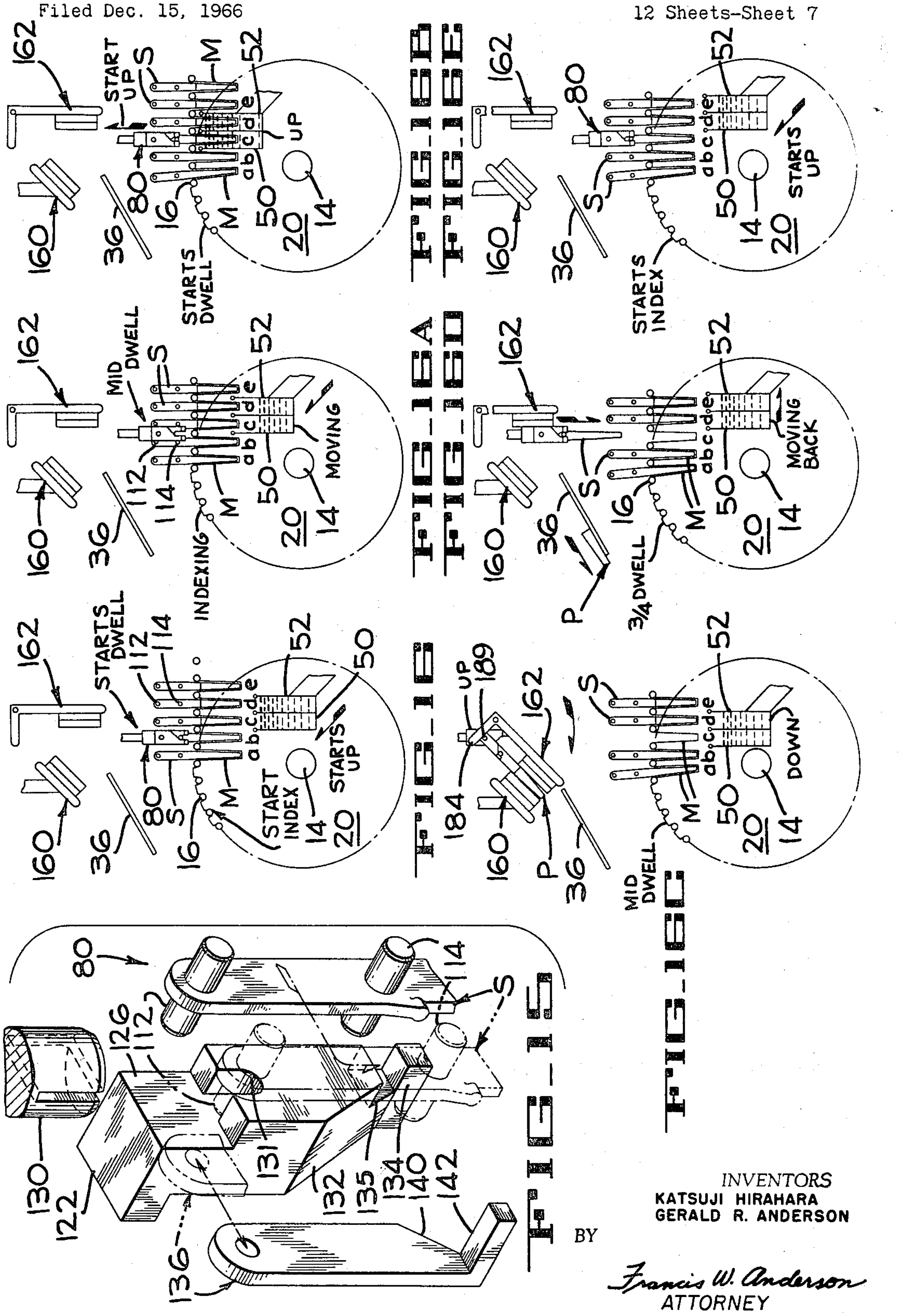
FIGURE 15 is an exploded perspective of one side of a carrier block.
FIGURES 16 to 16E are schematic mechanical operational diagrams of a cycle.

FIGURES 16 to 16E show step by step operation of at least one individual slab handling cycle. In FIGURE 16, a mold *a* is empty and has just passed the extraction station. A mold *b* has been emptied and is at that station. The sprocket 20 and conveyor chain 16 start to index with the carrier blocks 80 in their lowered position, over mold *b*.

In FIGURE 16A, the conveyor is indexing and the carrier blocks 80 are in the mid-dwell portion of the cycle. The divider strip pins 112, 114 of the divider strip for mold *b*, which had been previously reinserted in its mold, are moving clear of the keeper notches in the carrier blocks. A mold assembly *c* is approaching the carrier blocks 80 and this mold contains a frozen slab.

As to the defrost tanks 50, 52 in FIGURE 16, they have just started up toward the molds. In FIGURE 16A they are still moving, having a composite motion in both the vertical and the horizontal directions so that they keep pace with the mold conveyor, and with two of the molds, *c* and *d*.

In FIGURE 16B, the conveyor ceases indexing and starts its dwell period. The carrier blocks 80 start up. The defrost assembly tank is up, with tanks 50, 52 which contain warm water surrounding the mold assemblies *c* and *d*.

In FIGURE 16C, the conveyor is in mid-dwell. The carrier blocks 80 has withdrawn the slab from the mold and the cam roller 189 on the extractor bar 84 (see also FIGURE 2) has caused the movable breaker 162 to rap the slab against the fixed breaker 160 to break up the slab into the product bars P, as previously described. At this time, the defrost tanks 50, 52 will have returned to their down position, and are being moved back by cylinder assembly 62.

In FIGURE 16D, the separated product bars P are sliding down the chute 36 and the extractor bar is half way down on its way to reinserting the divider strips into the mold *c*, from which they had been removed. The defrost tanks 50, 52 are half way through their dwell period in their lowered position, but are being moved back to be lined up under the next set of molds by the retracting pawl rod 42.

In FIGURE 16E the cycle is completed. The extractor blocks 80 have reinserted divider strips into the mold assembly *c*. The conveyor chain starts to index, and the defrost tank assembly 50, 52 starts up in time with index motion.

SEQUENCE CIRCUIT

As has been indicated, it is necessary that the index cylinder 40, the extractor cylinder 86 and the defrost tank operating cylinder 62 be timed relative to one another so that the sequence described in connection with FIGURES 16 to 16E is attained. Although the details of the control mechanism that accomplish this are not critical to the present invention, FIGURES 18 to 22 illustrate a simple, self timing, self sequencing air circuit which will accomplish the desired results. The circuit thus illustrated is all fluid and employs conventional valves and actuators (pistons), so that a detailed explanation of the structure of the components is unnecessary, these being known in the art. Valves 40*a*, 86*a* and 62*a* are conventional directional control valves for cylinders 40, 86 and 62. These valves are remotely operated by air. They include detents so that they remain in the position in which they were left by the operating lines.

Figure 18:
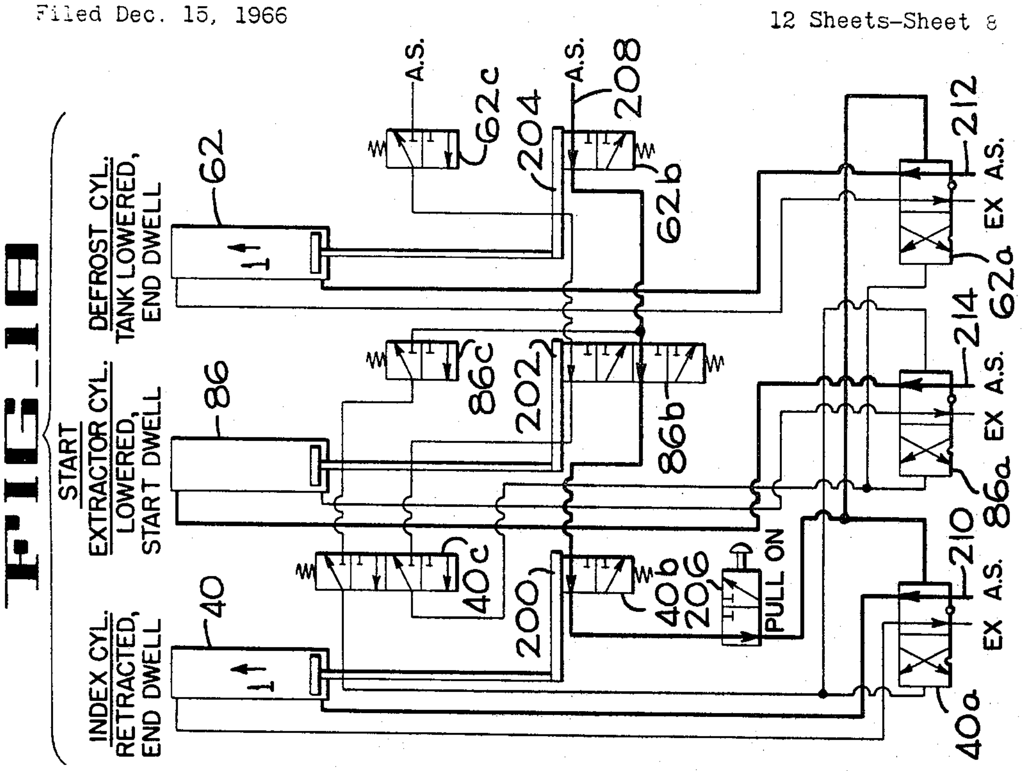
FIGURES 18–22 are operational diagrams of the hydraulic circuit for the embodiment described.

Valves 40*b*, 86*b* and 62*b* are mechanically operated pilot valves that are shifted into one position by fingers 200, 202 and 204, associated with the cylinders 40, 86 and 62 when the latter are in the position of FIG. 18. These valves are spring urged to the other position when the fingers are shifted away from them.

Valves 40*c*, 86*c* and 62*c* are also spring loaded pilot valves operated by the fingers 200, 202, and 204 respectively, but these are shifted when their associated cylinders are in the other position from that shown in FIGURE 18. Valve 206 is a control valve which is pulled to turn the system on.

In the diagrams, the symbols A.S. stands for "air supply" and EX stands for "exhaust." The fingers 200, 202, 204 are not shown in the detailed mechanical drawings nor are the various valves. These can be placed at any physically convenient place on the machine; and they are omitted in the mechanical drawings for clarity.

Figure 17:
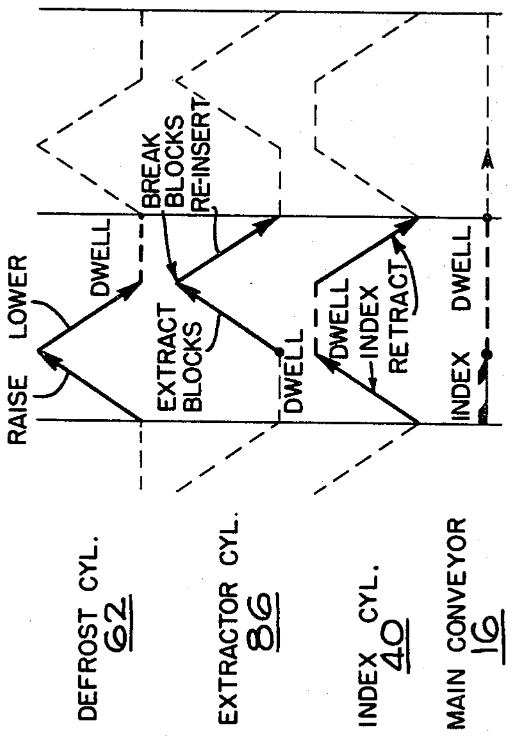
FIGURE 17 is a timing diagram of a cycle.

The explanation of the circuit in FIGURES 18–22 can be best understood by reference to the timing diagram of FIGURE 17, which is self explanatory, and which also can be related directly to the operational mechanical diagrams of FIGURES 16 to 16E.

In FIGURE 18, the elements are shown in their "start" position with the index cylinder 40 retracted and at the end of its dwell period. The extractor cylinder 86 is lowered and at the start of its dwell period, and the defrost tanks lowered and at the end of their dwell period. When the "Pull On" switch 206 is pulled to the position shown, an air supply line 208 connects through the pilot valves 62*b*, 86*b*, 40*b*, the valve 206, and on to the right sides of the directional control valves 40*a* and 62*a*. This is shown by the heavy lines in the diagram. This connects an air supply line 210 to the index cylinder 40 to initiate an index stroke, and also connects an air supply line 212 to the defrost cylinder 62, in order to raise the defrost tanks. An air supply line 214 will have been previously connected to the extractor cylinder 86 in order to bring it to its lowered position.

Figure 19:
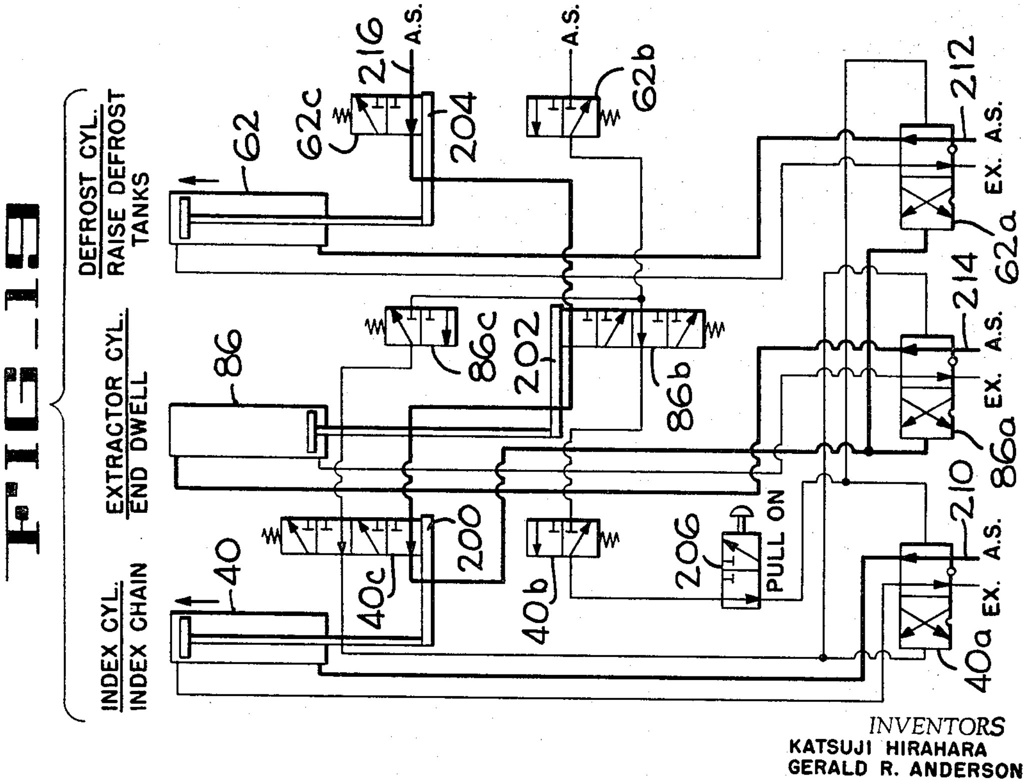

In FIGURE 19, the index and defrost cylinders have been raised in a manner obvious from the diagram. This indexes the chains and raises the defrost tanks. The pilot valves 40*c*, 62*c* have been shifted by the fingers 200, 204. This connects an air supply line 216 through the pilot valves 86*b* and 40*c* to the left side of the directional control valves 86*a* and 62*a*. The air supply line 210, which has caused the index cylinder 40 to index the chain, holds the cylinder in its forward dwell position (FIG. 17), because the control valve 40*a* was left in its previous position. The directional control valves 86*a* and 62*a* have not yet been shifted by the air supply line 216 in FIGURE 19.

Figure 20:
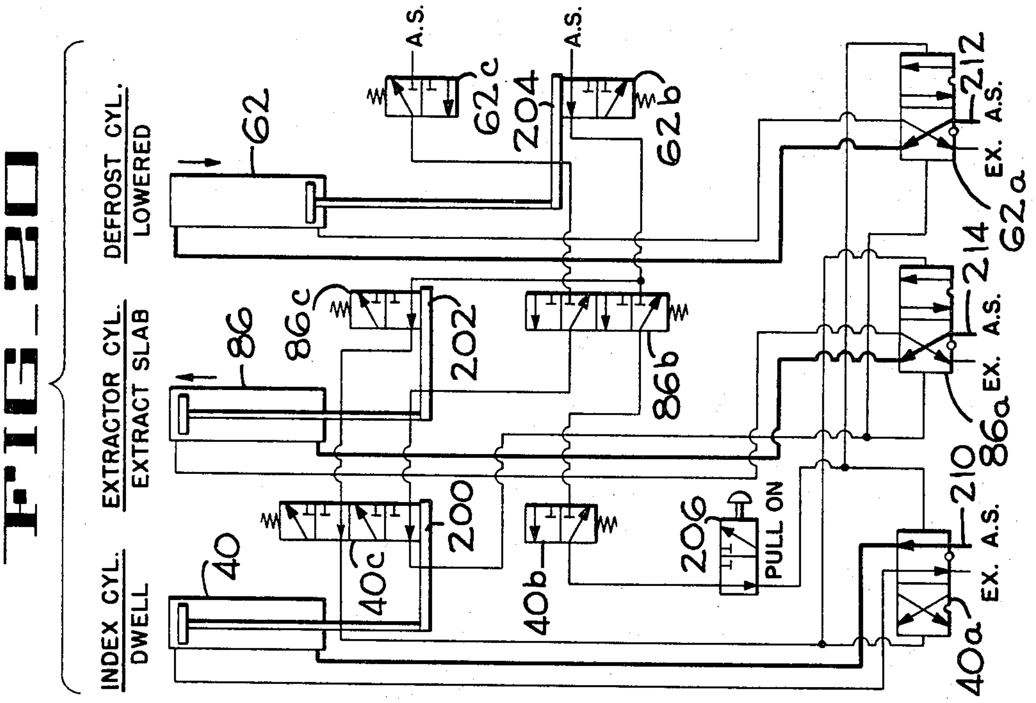

In FIGURE 20, the control valves 86*a* and 62*a* have been shifted to the right, reversing the air supply to the extractor and defrost cylinders. The extractor cylinder 86 now raises the extractor bar to extract the slab, and the defrost cylinder lowers the defrost tanks. The index cylinder 40 remains in its dwell position. When the extractor cylinder is raised and the defrost cylinder is lowered, pilot valves 86*c* and 62*b* are operated, as seen in FIGURE 20.

The defrost cylinder 62 remains connected to the air supply line 212 and starts its dwell period in the lower position.

Figure 22:
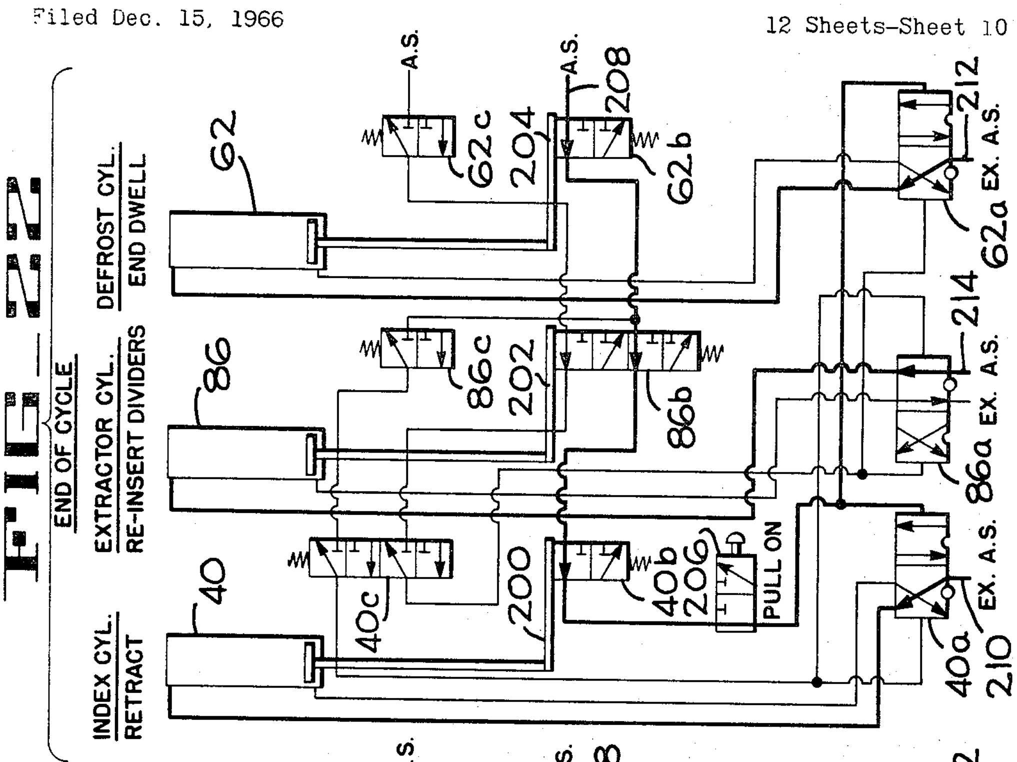
Figure 21:
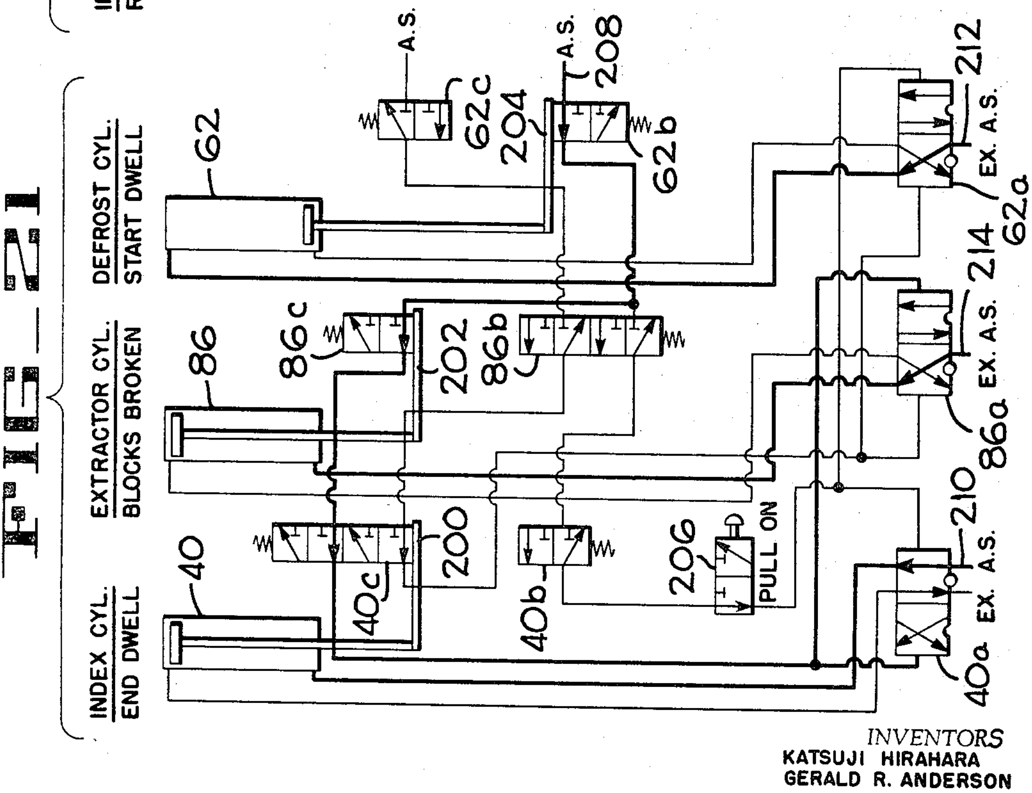

In FIGURE 22, directional control valves 40*a* and 86*a* for the extractor cylinders have been shifted to the right and to the left respectively, by the air line 208 and pilots 86*c* and 40*c*, as set up in FIG. 21. The air supply line 210 is now connected to the other end of the index cylinder, to cause it to retract. The air supply line 214 is also connected to the other end of the extractor cylinder so as to cause it to be lowered, and to reinsert the dividers (now freed from the slab) into the mold from which they were removed. The air supply line 212 is shown as still connected to the defrost cylinder to hold the latter in its lowered position, but this is the end of its dwell stroke in this position. Fingers 200, 204 have shifted pilots 40*b*, 62*b* to connect the air supply line 208 to the right of control valves 40*a*, 62*a*, but these valves have not yet shifted in FIG. 22. The elements are returned to the positions in which they were initially, as shown in FIGURE 18.

Figure 23:
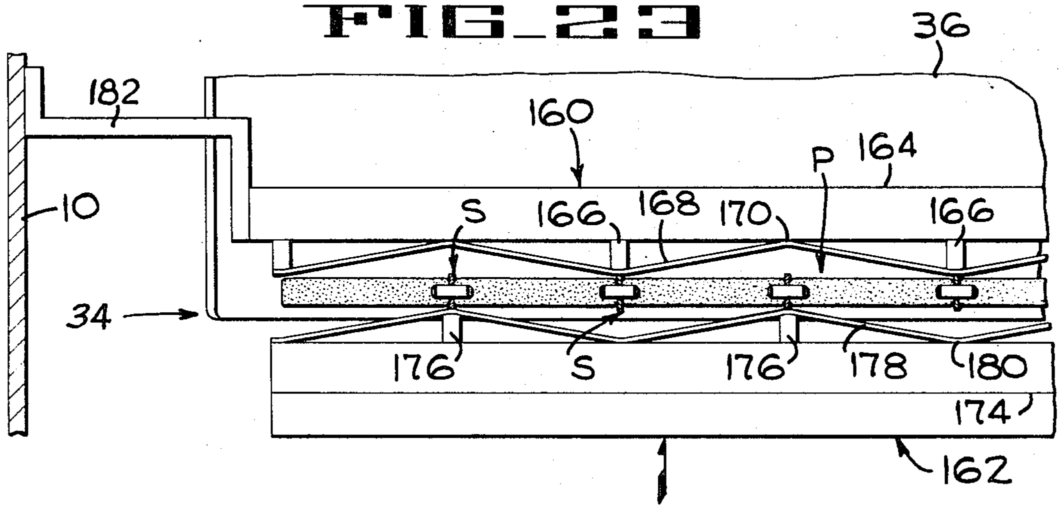
FIGURE 23 is a section taken on line 23—23 of FIGURE 2, showing the slab breaking action upon initial contact with the breaker bars.

FIGURES 23–26 illustrate how the slab breaking mechanism of the present invention presses against the slabs at opposite edges of adjacent divider strips for breaking the slab apart at the divider strips. As mentioned, FIGURE 23 shows the condition of the parts just when the movable breaker 162 has carried the slab up against the fixed breaker 160. The corners of plates 178 directly engage the edges of the divider strips.

Figure 24:
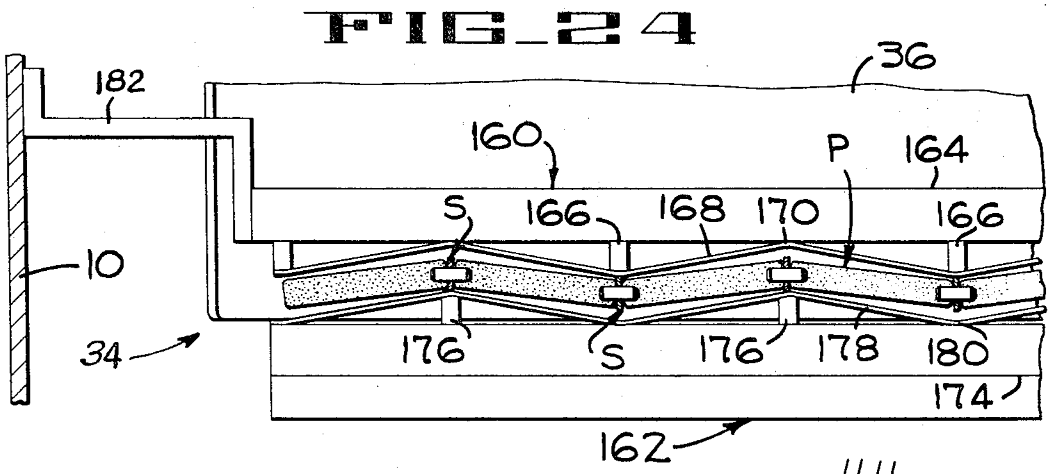
FIGURE 24 is a view like FIGURE 23 with a slab broken into product blocks.

FIGURE 24 shows the completion of the slab breaking process. It is pointed out that the dividers are pivotally supported for swinging motion only in planes perpendicular to the plane of the mold. The dividers cannot twist on their supports to move with one block edge or the other. This insures an early clean break between each divider and both adjacent blocks.

Figure 25:
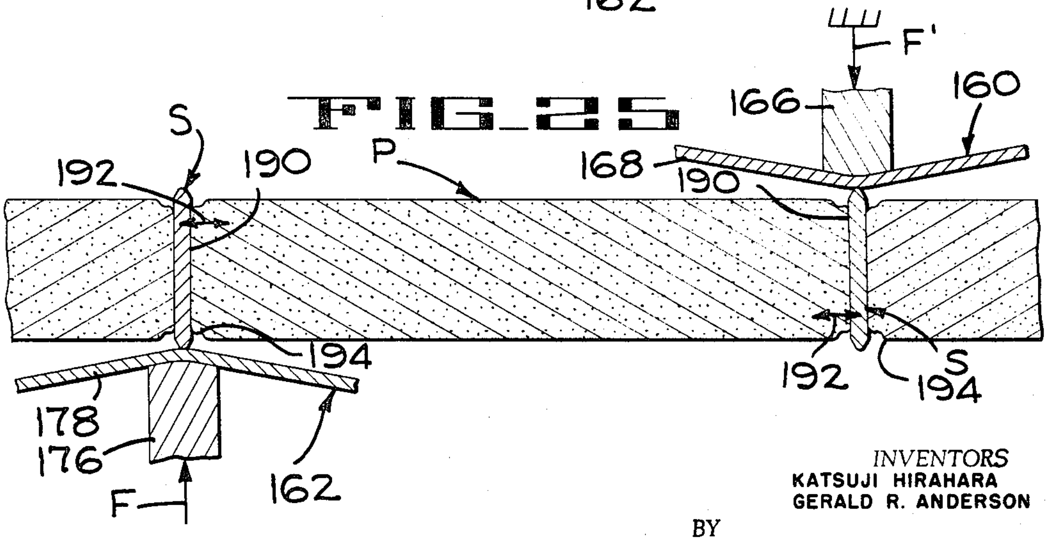
FIGURE 25 is an enlarged fragmentary section like FIGURE 24, showing force application to the divider strips and slab blocks.

FIGURES 25 and 26 show how the breakers 160, 162 apply equal, opposed and longitudinally offset shearing forces F and F' directly to opposite sides of adjacent divider strips S. These forces generate shearing or slip forces along the interfaces 190 between the product blocks P and the divider strips S. The shearing forces also exert a bending action between the divider strips and intervening product blocks P, tending to separate the blocks P from the divider strips in a direction longitudinally of the slab, as indicated by the small arrows 192 in FIGURE 25. The result of this interaction of forces is a clean break along the interfaces.

FIGURE 25 also shows how the divider strip and mold assembly of the present invention produces relieved corners 194 of the block P at the divider strips S. The feathers at these corners are melted away or weakened. The remaining corner formation not only minimizes cutting of the wrapper package for the finished blocks but also weakens the slab assembly at the divider strips for facilitating the aforesaid slab breaking action.

FIGURE 26 is self explanatory but is presented in order to more clearly illustrate how the carrier unit mounts the divider strips for accommodating relatively opposite swinging of alternate dividing strips on pins 112 in keeper notches 131, during the slab breaking operation, so that the full effectiveness of the slab breaking forces previously described will be attainable. As mentioned, since the dividers cannot twist on their pivots to follow the adjacent edge of either block, this swinging action of the dividers soon frees both blocks from each divider.

Having completed a detailed description of a preferred embodiment of the invention it will now be apparent how the various features and advantages of the invention referred to in the opening statements can be attained.

Although the best mode contemplated for carrying out the present invention has been herein shown and described, it will be apparent that modification and variation may be made without departing from what is regarded to be the subject matter of the invention as set forth in the appended claims.

What is claimed is:

1. Frozen block making apparatus comprising a conveyor, a plurality of elongate molds spaced along the conveyor, divider strips for said molds, means for removably mounting said divider strips in said molds to form a mold assembly, means for freezing product material in said mold assembly to form composite slabs of frozen material and divider strips, extractor means downstream of said freezing means for extracting said slabs from the molds, breaker means for breaking the extracted slabs into frozen product blocks free from their divider strips, and means for inserting bare divider strips into empty molds preparatory to refilling the latter.

2. The apparatus of claim 1, including means for indexing said conveyor as a function of the mold spacing.

3. The apparatus of claim 2, wherein said divider strips project above the molds, said extractor means comprising carrier means for gripping the projecting portions of the strips.

4. The apparatus of claim 2, wherein said extractor means includes means for supporting said slab by the divider strips, said breaker means comprising opposed bars for simultaneously pressing against the product slabs at opposite edges of adjacent divider strips.

5. The apparatus of claim 3, wherein said breaker means comprises fixed and movable bars, and means on said movable bar for operation of the bar by said extractor means when the latter is raised.

6. The apparatus of claim 5, wherein said divider strip mounting means comprises pivot means for restricting swinging motion of each divider strip in the plane of motion of said movable bar.

7. The apparatus of claim 2, wherein said conveyor is endless having upper and lower reaches, said divider strip mounting means comprising clip devices which hold the divider strips in place in the molds on said lower reach against gravity.

8. Frozen block making apparatus comprising a conveyor, a plurality of elongate molds spaced along the conveyor, divider strips for said molds, means for removably mounting said divider strips in said molds with said strips projecting above said molds to form a mold assembly, supporting means on the upper portions of said strips, means for freezing product material in said mold assembly to form composite slabs of frozen material and divider strips, means for indexing said conveyor as a function of the mold spacing, vertically reciprocable slab extractor means downstream of said freezing means, said extractor means comprising carrier means formed for accommodating through passage of said divider strip supporting means when the extractor means is lowered, said carrier means having means for lifting said divider strips upon raising of the extractor means when said conveyor is indexed to a position aligning the divider strips with the carrier means, breaker means for breaking the extracted slabs into frozen product blocks free from their divider strips, and means for inserting the bare divider strips into empty molds preparatory to refilling the latter.

9. The apparatus of claim 8, wherein said divider strip supporting means comprises pivot pin means for accommodating relative swinging of the divider strips during breaking of the slabs.

10. Frozen block making apparatus comprising a conveyor, a plurality of elongate molds spaced along the conveyor, divider strips for said molds, means for removably mounting said divider strips in said molds to form a mold assembly, means for freezing product material in said mold assembly to form composite slabs of frozen material and divider strips, means for indexing said conveyor as a function of the mold spacing, thawing tanks for said molds, means for bringing said tanks up to said molds and advancing the tanks with the molds during conveyor indexing, extractor means downstream of said freezing means for extracting said slabs from the molds, and breaker means for breaking the extracted slabs into frozen product blocks free from their divider strips.

11. Frozen block making apparatus comprising a conveyor, an endless conveyor having upper and lower reaches, a plurality of elongate molds spaced along the conveyor, divider strips for said molds, means for removably mounting said divider strips in said molds to form a mold assembly along said upper conveyor reach to form composite slabs of frozen material and divider strips, means for indexing said conveyor as a function of the mold spacing, extractor means downstream of said freezing means for gripping the divider strips and extracting said slabs from the molds, means for freeing the frozen product from the divider strips, means for inserting the bare divider strips into empty molds on said upper reach preparatory to refilling the latter, said divider strip mounting means supporting the strips against gravity on said lower conveyor reach.

12. Apparatus for making blocks of frozen materials such as food products or the like, comprising a plurality of long narrow molds, a single row of divider strips disposed along each mold, each strip extending across the mold, means for freezing material in the molds to form a composite slab of frozen material blocks and divider strips, means for separating the slab from the mold, and means for pressing against the opposite edges of adjacent divider strips for breaking the material blocks from the strips.

13. The method of forming blocks of frozen material comprising the steps of inserting divider strips in spaced relation along an elongate mold, filling the mold with unfrozen material, freezing the material in the mold to form a composite slab, supporting the frozen slab by the divider strips while separating the frozen slab and the mold, and simultaneously pressing against the slab at opposite edges of adjacent divider strips for breaking the slab apart at the divider strips.

14. The method of making blocks of solidified frangible materials comprising the steps of molding an elongate slab of material having divider strips spaced longitudinally along the slab and with the divider strips having a width substantially equal to that of the slab so that the edges of the strips extend along the side faces of the slab and thereby divide the slab into blocks, separating the slab and mold, and simultaneously pressing against the opposite edges of adjacent divider strips for exerting shearing stresses between the divider strips and the edges of the blocks bonded thereto during molding, and continuing said pressure until the various block edges break loose from the divider strips.

15. The method of making blocks of solidified frangible materials comprising the steps of molding an elongate slab of material having divider strips spaced longitudinally along the slab and with the divider strips having a width substantially equal to that of the slab so that the edges of the strips are spaced along the side faces of the slab and thereby divide the slab into blocks, the divider strips projecting above the slab, separating the slab and mold while pivotally supporting the slab by the projecting portions of the divider strip; and pressing against the opposite edges of adjacent divider strips simultaneously for exerting shearing stresses between the divider strips and the edges of the blocks bonded thereto during molding, and continuing said pressure until the divider strips swing on their pivots and various block edges break loose from the divider strips.

16. The method of making blocks of frozen material such as food products or the like comprising the steps of simultaneously inserting a plurality of divider strips as a row along each of a chain of elongate molds, filling the molds with unfrozen material, freezing the material in the molds and to the divider strips to form slabs, grasping the divider strips and freeing the frozen slabs from the molds, breaking the freed slabs into blocks bounded by the divider strips while supporting the slabs by the divider strips, and thereafter reinserting the divider strips of each row into empty molds for a new cycle.

17. Frozen block making apparatus comprising a conveyor, a plurality of elongate molds spaced along the conveyor, insert strips for said molds, means for removably mounting said insert strips in said molds to form a mold assembly, means for freezing product material in said mold assembly to form composite slabs of frozen material and insert strips, extractor means downstream of said freezing means for extracting said slabs from the molds, means for freeing the frozen product material from said insert strips, and means for inserting bare insert strips into empty molds preparatory to refilling the latter.

References Cited

UNITED STATES PATENTS

| | | | |
|---|---|---|---|
| 699,856 | 5/1902 | Stutz. | |
| 954,773 | 4/1910 | Armstrong | 225—104 |
| 1,159,058 | 11/1915 | Manns. | |
| 3,031,978 | 5/1962 | Rasmusson | 107—8.05 |
| 3,175,746 | 3/1965 | Porter et al. | 225—104 |
| 3,327,651 | 6/1967 | Nielsen | 107—8.05 |

WALTER A. SCHEEL, *Primary Examiner.*

J. SHEA, *Assistant Examiner.*